United States Patent [19]

Heesch

[11] Patent Number: 4,696,515

[45] Date of Patent: Sep. 29, 1987

[54] INFINITE MANUAL SEAT BACK RECLINER

[75] Inventor: Max O. Heesch, Ypsilanti, Mich.

[73] Assignee: ITT Corporation, New York, N.Y.

[21] Appl. No.: 832,829

[22] Filed: Feb. 24, 1986

[51] Int. Cl.$^4$ .............................................. B60N 1/02
[52] U.S. Cl. .................................. 297/374; 192/126 A; 297/355
[58] Field of Search ............... 297/361, 362, 374, 354, 297/355, 366–369; 192/8 C, 126 A, 17 D; 188/77 R, 77 W

[56] References Cited

U.S. PATENT DOCUMENTS

| | | | |
|---|---|---|---|
| 1,773,597 | 8/1930 | Myerson | 297/355 |
| 2,547,828 | 4/1951 | Maussnest | 188/77 R |
| 3,343,872 | 9/1967 | Werner et al. | 297/362 |
| 4,278,032 | 7/1981 | Kritske | 188/77 W X |
| 4,469,375 | 9/1984 | Boyer | 297/362 |
| 4,521,055 | 6/1985 | Fudala | 297/362 |
| 4,573,738 | 3/1986 | Heesch | 297/362 |

Primary Examiner—Kenneth J. Dorner
Assistant Examiner—Mark W. Binder
Attorney, Agent, or Firm—James B. Raden; Donald J. Breh

[57] ABSTRACT

A seat back recliner mechanism is disclosed including a serially arranged gear train having a pair of infinitely adjustable spring coil clutches serially arranged by way of a reduction gear. One clutch absorbs rotational loading on the seat back in one direction, and one clutch absorbs rotational loading on the seat back in the opposite direction.

12 Claims, 2 Drawing Figures

INFINITE MANUAL SEAT BACK RECLINER

BACKGROUND OF THE INVENTION

This invention relates to automotive seat recliners and more particularly, to an infinitely adjustable seat recliner incorporating a spring-type clutch mechanism.

A seat recliner utilizing a spring clutch mechanism of the type contemplated for use in the present invention is described in my co-pending U.S. application, Ser. No. 787,267 filed Oct. 15, 1985. The recliner disclosed therein is provided with an infinitely adjustable seat back made possible by use of a pair of spring coil clutches tandemly mounted on a common spindle having oppositely wound windings which provides for retention of the spindle, and thus the seat back, at a desired angular position against rotational loading in both directions of movement of the seat.

This tandem spring arrangement sharing a common clutch spindle, while effective, has two principle shortcomings. First, the side-by-side arrangement of the clutch springs is not space efficient in that the width of the seat frame side rails must be increased to accommodate the combined width of the two clutches.

Secondly, one clutch absorbs the rotational loading caused by rearwardly directed forces on the seat back due to, for example, inertial forces generated in rear end impacts or user initiated forces, which can be significantly greater than forces imposed on the seat in a forward direction. In the tandem clutch spring arrangement, one spring must be designed to withstand the increase in loading which requires more costly spring and clutch components and precludes interchangeability of the two clutch springs unless one of the springs is over designed, which is also not cost efficient. It can be appreciated that manufacturing costs are thereby significantly increased.

SUMMARY OF THE INVENTION

It is, therefore, a principle object of the present invention to provide for a reclining seat assembly that is space efficient in that the seat frame side rails are maintained thin in comparison to present infinitely adjustable seat frames.

It is another principle object of the invention to provide an infinitely adjustable spring clutch assembly that utilizes two identically designed clutch springs, but which will effectively absorb different levels of rotational loading imposed on the seat back.

The shortcomings of the prior art are overcome and the objectives of the invention are achieved by providing for a dual spring clutch mechanism mounted in a serially arranged gear train, thereby positioning the respective clutch assemblies fore and aft of each other within the frame side rail rather than in a side-by-side tandem relationship. The serial relationship thereby provides for minimization of the width of the frame side rails.

According to another feature of the invention, a load reduction gear is interposed in the gear train between the two clutches which places one clutch farther down the gear train and reduces the rotational load imposed on the one clutch spring due to the higher rearwardly directed loads on the seat back, thereby allowing both springs to be designed for the same loading and providing for interchangeability and proper operation of the two clutches, even in the event of greater rearwardly directed loads on the seat.

BRIEF DESCRIPTION OF THE DRAWING

The invention will be better understood after a reading of the following Detailed Description Of the Preferred Embodiment when taken in conjunction with the accompanying drawings in which.

DETAILED DESCRIPTION OF THE PREFERRED EMBODIMENT

Figure 1:
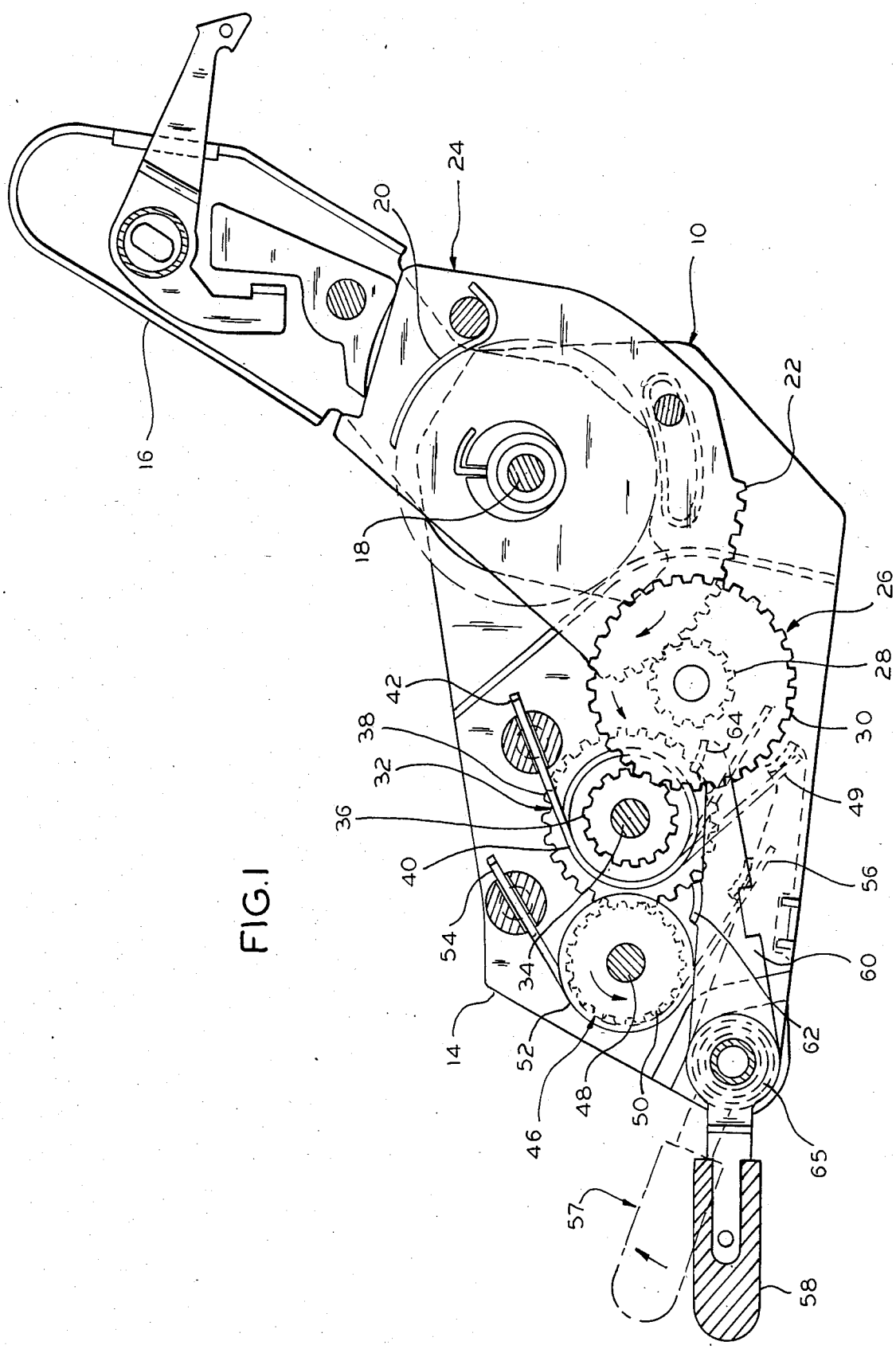
FIG. 1 is a side-elevational view of a preferred embodiment of the invention with the front side plate of the frame removed for clarity showing details of construction and operation of the reclining seat mechanism.
Figure 2:
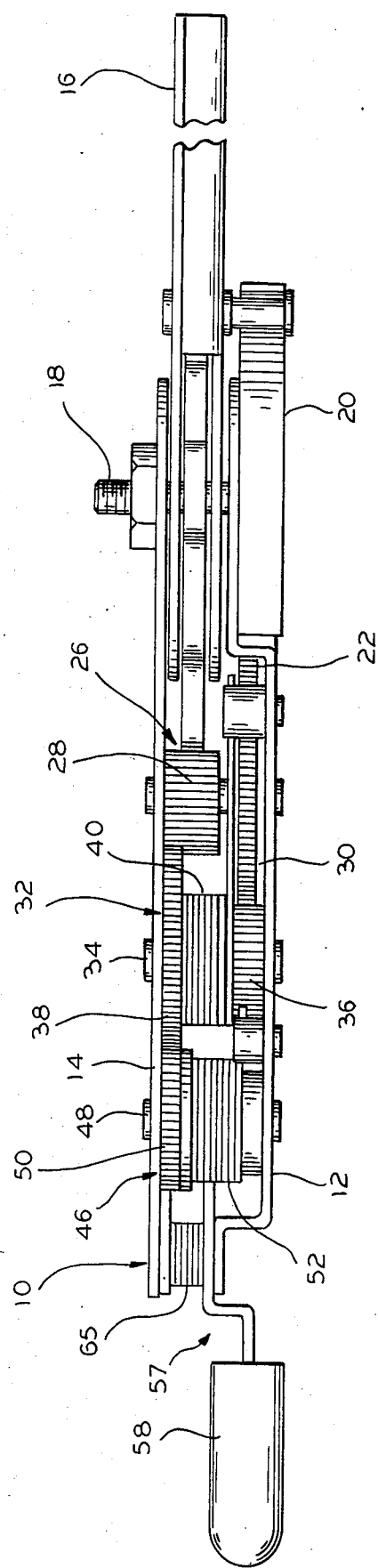
FIG. 2 is a top-elevational view of the reclining seat of FIG. 1 showing details of construction.

Referring to FIGS. 1 and 2, there is shown a reclining seat mechanism comprising a base frame 10 including a pair of parallel front and rear side rail members 12, 14 and a seat back support 16 pivotably mounted to the side rails of the frame by way of a pivot pin 18. The seat back support 16 is pivotable between an upright position and a fully reclined position about the pin 18 and a coil return assist spring 20 assists in the return of the seat back support 16 toward the upright position. The seat back support is infinitely adjustable and is retained at selected angular positions between the extreme upright and reclined positions by the structure described hereinbelow.

The seat back support 16 is provided with a sector gear 22 at its end positioned internally of the base frame between the side rail members 12, 14. The sector gear 22 can be operationally connected to the seat back support by physical attachment of the gear to the support member end or by providing the sector gear on an inertia responsive latch mechanism 24 as shown in FIG. 1. The inertia latch, while shown in the preferred structure of the seat recliner, does not, however, constitute part of the present invention and is shown only as a representative structure for incorporating the sector gear 22 in the gear train of the invention.

A first gear set 26 is mounted between the side rails 12, 14, and includes a first gear 28 defining a pinion meshed with the sector 22 of seat back support and a second larger diameter gear 30. A first coil spring clutch assembly 32 is mounted between the side rails 12, 14 and includes a spindle 34 having a first clutch gear 36 affixed to the spindle and meshed with the larger diameter gear 30 of the gear set 26 for causing the spindle 34 to rotate in response to movement of the seat-back support 16.

A second clutch gear 38 having a diameter greater than the first clutch gear 36 is also affixed to the spindle 34 of the first clutch assembly 32 and also rotates with the spindle 34 in response to movement of the seat-back support.

A spring coil 40 is wound around the spindle 34 in a counter-clockwise direction, as viewed in FIG. 1, and has one end 42 thereof affixed to the base frame against movement. The opposite end 44 of the spring 40 is unrestrained and is free to move. The spring 40 is normally tensioned to frictionally engage the spindle 34, and prevent its rotation. The spring 40 has its greatest holding ability in a counter-clockwise direction of rotation of the spindle 34, opposite to the direction indicated by the arrow on the clutch 32 in FIG. 1. The arrows in FIG. 1 are intended to show the serial arrangement and movement of the gear train as the seat back 16 is moved toward a reclined position. It can be seen that the clutch assembly 32, therefore, has its greatest holding power on the gear train and seat back support 16 when the seat back support is under the influence of forwardly directly loading forces tending to pivot the seat back support toward the upright position.

Similarly, a second clutch assembly 46 is mounted between the side rails 12, 14 and includes a spindle 48 also having a clutch gear 50 affixed thereto which is meshed with the larger clutch gear 38 of the first clutch assembly 32. The second clutch assembly 46 is serially arranged in relation to the first clutch assembly 32, the gear set 26, and the sector gear 22 and rotates in a direction opposite to that of the spindle 34 of the first clutch 32, as indicated by the arrow on the clutch assembly 46. The second clutch assembly 46 also includes a coil spring 52 on the spindle 48 which is wound in the same direction as that of the coil spring 40. Also, one end 54 of the spring 52 is affixed to the frame against movement and the opposite end 56 is unrestrained.

The clutch assembly 46 also has its greatest holding ability in the counter-clockwise direction of rotation of the spindle 48 and due to the serial arrangement, and thus, reversal of the direction of rotation of the spindle 48 from that of spindle 34, the clutch 46 has its greatest holding ability on the gear train and seat back support 16 when the seat back support is under the influence of rearwardly directed loading forces tending to pivot the seat toward the reclined position. Rotational loading in this rearward direction is most often greater than in forward direction, therefore, the second clutch gear 38 is made to have a larger diameter than the clutch gear 50, thereby defining a gear reduction for reducing the load imposed on the clutch assembly 46 to a fraction of the actual rearwardly directed load on the seat back support 16. By doing so, the spring 52 can be designed for the reduced load and preferably, be the same as and interchangeable with the spring 40 of the first clutch 32.

It can be seen that the serially arranged gear train and reduction system provides for a relatively thin frame side rail from the present tandem clutch structures and for interchangeability of the two clutch assemblies regardless of different levels of loading on the seat back support.

Still referring to FIG. 1, there is shown a release lever 57 having an operator handle 58 and an actuating portion 60. The actuating portion 60 includes a pair of protrusions 62, 64 which engage the respective free ends 56, 44 of the springs when the handle is moved to the released position, as shown by the phantom lines in FIG. 1. The lever is normally biased into a clutch engaged position by a torsion spring 65. The protrusions 62, 64 contact and cause the spring ends of the springs to separate when the lever is moved to a clutch-released position, thereby reducing the tension of each spring and allowing free rotation of the spindles and gear train and positioning of the seat back support to any of an infinite number of positions between the upright and reclined positions.

Having described the preferred embodiment of the invention, those skilled in the art having the benefit of the description and drawing can readily devise other modifications and embodiments which are to be considered to be within the scope of the appended claims.

What is claimed is:
1. A seat recliner comprising:
  a base frame;
  a seat back support pivotably mounted to said base frame for movement between an upright position and a reclined position, said seat back support including a sector gear;
  a gear set having a first gear meshed with said sector gear and a second gear;
  first clutch means mounted to said base frame including a first spindle, a first clutch gear mounted to said first spindle for rotation therewith and meshed with said second gear of said gear set;
  first spring coil means around said first spindle adapted to be normally tensioned and frictionally engaged to said first spindle to lock said seat support in a selected position against movement due to a first force on said seat back support in one direction of said pivotable movement thereof, and a second clutch gear mounted to said first spindle for rotation with said first spindle and said first clutch gear;
  second clutch means mounted to said base frame including a second spindle, a third clutch gear mounted to said second spindle for rotation therewith and meshed with said second clutch gear of said first clutch means, second spring coil means around said second spindle adapted to be normally tensioned and frictionally engaged to said second spindle to lock said seat back support in said selected position against movement due to a second force on said seat back support in a second direction of said pivotal movement opposite said one direction; and
  clutch release means mounted on said base frame for releasing said tension in each of said spring coil means to release said frictional engagement thereof to each said spindle, whereby said seat back support is pivotable to said selected position between said upright and reclined position.

2. The seat recliner as defined in claim 1, wherein said gear set, said first and said second clutch gears, and said third clutch gear define a series arranged gear reduction system wherein a rotational load developed at said seat back support is reduced to a fraction thereof at said second clutch means.

3. The seat recliner as defined in claim 2, wherein said second clutch gear has a diameter greater than said first clutch gear and of said third clutch gear.

4. The seat recliner as defined in claim 3, wherein said second gear of said gear set has a diameter greater than the diameter of said first gear of said gear set.

5. The seat recliner as defined in claim 4, wherein said second gear of said gear set has a diameter greater than the diameter of said second clutch gear.

6. The seat recliner as defined in claim 1, wherein each of said first and said second spring coil means includes pair of ends, one of said pair of ends of each of said spring coils being affixed against movement, the second of said pair of ends of each of said spring coils being unrestrained.

7. The seat recliner as defined in claim 6, wherein said release means includes lever-operated means for separating each of said pair of ends of each of said spring coils to unwind said coil springs and reduce said tension thereon.

8. The seat recliner as defined in claim 7, wherein said lever-operated means includes;
  a lever pivotably mounted to said base frame defining a handle portion and an actuating portion;

a pair of protrusions on said actuating portion, each protrusion adjacent a respective one of said unrestrained ends of each of said spring coils and configured to contact said unrestrained ends upon actuation of said lever toward a released position.

9. The seat recliner as defined in claim 8, wherein said release lever is normally biased into an engaged position.

10. A seat recliner comprising:
a base frame;
a seat back support pivotably mounted to said base frame for movement to a selected position between an upright position and a reclined position including a sector gear;
a gear set mounted to said base frame meshed with said sector gear;
first spring coil clutch means operatively connected to said gear set for releasably holding said seat back support in said selected position against a first rotational load developed in a first direction at said seat back support; and second spring coil clutch means operatively connected to said first spring coil clutch means by a load reduction gear interposed between said first spring coil clutch means and said second spring coil clutch means for releasably holding said seat back support in said selected position against a second rotational load developed in a second direction at seat back support.

11. The seat recliner as defined in claim 10, wherein said first direction of said first rotational load is toward the upright position of said seat back support and said second direction of said second rotational load is toward the reclined position of said seat back support.

12. The seat recliner as defined in claim 10, wherein said sector gear, said gear set, said first and second spring coil clutch means, and said load reduction gear define a serially arranged gear and clutch system, whereby said second rotational load on said second spring clutch means is fractionally reduced at said second spring coil clutch means.

* * * * *